Feb. 13, 1962     J. E. MURDOCK, JR     3,020,755
SHRINKAGE MEASURING DEVICE

Filed June 29, 1959     2 Sheets-Sheet 1

INVENTOR
John E. Murdock, Jr.
BY
W. J. Eccleston
ATTORNEY

INVENTOR
John E. Murdock, Jr.
BY W. J. Eccleston.
ATTORNEY

United States Patent Office 3,020,755
Patented Feb. 13, 1962

3,020,755
SHRINKAGE MEASURING DEVICE
John Emerson Murdock, Jr., 3000 Sherwood Lane,
Hopewell, Va.
Filed June 29, 1959, Ser. No. 823,785
16 Claims. (Cl. 73—159)
(Granted under Title 35, U.S. Code (1952), sec. 266)

The invention described herein, if patented, may be manufactured and used by or for the Government for governmental purposes, without the payment to me of any royalty thereon.

The present invention relates to a device for measuring articles of apparel or the like which includes an expandable form for receiving the article to be measured, and more particularly to improved mechanism for expanding and contracting the form.

While various expedients have heretofore been used to measure the size or determine the shrinkage in articles of apparel such as hose which are made of fabric materials that may shrink after laundering or other cleansing, certain disadvantages are inherent in the use thereof. For example, at the present time, the size of socks is commonly measured by one of three methods. One of these methods utilizes a hand rule or scale to make the required measurements. This is a time-consuming method because it requires that the socks be smoothed out on a flat surface in a fairly taut condition. It is also subject to inaccuracies because it is hard for the operator to make certain that the same force is applied to the socks successively measured to flatten and tension the same throughout the course of the numerous measurements which may be made during a day's time.

Another method now in use requires that marks be placed at predetermined locations on the socks to be measured. The accuracy of this method thus depends on the care exercised in the placement of these marks. In another method, known as the Schiefer method, mechanical means are used to a large extent in making the measurements so that it is more accurate than the methods heretofore mentioned. However, the socks are perforated in the practice of this method so that it is unsatisfactory for that reason. The present invention is directed to mechanism for overcoming these and other disadvantages of the existing apparel measuring equipment.

Accordingly, an object of the invention is to provide a new and improved device for measuring articles of apparel such as hose.

Another object of the invention is to provide a new and improved device for measuring articles of apparel such as hose in which damage to or distortion of the article during the course of taking a measurement is avoided.

Still another object of the invention is to provide an apparel or the like measuring device having an expandable and contractable form for receiving the article to be measured including new and improved means for controlling expansion of the form so that the articles successively measured on the device are all filled out to the same degree of tautness and thus greater uniformity in measurement is obtainable.

A further object of the invention is to provide a new and improved device as set forth in the preceding objects which includes electrically responsive means for controlling the tautness to which the articles are filled out in successive measurements to insure uniformity in the successive measurements.

A still further object of the invention is to provide a new and improved measuring device as set forth in the preceding objects in which the need for the exercise of human judgment is reduced to a minimum, thereby eliminating errors from this source.

Another object of the invention is to provide a new and improved hose measuring device which may include direct reading indicating means to indicate the size or variations from the purported size such as the percentage of shrinkage.

A further object of the invention is to provide a new and improved device for measuring hose including an expandable form for receiving the hose to be measured which may be readily modified to adapt the same for measuring other items of apparel.

A more general object of the invention is to provide a new and improved hose measuring device which is relatively simple, compact, inexpensive and sturdy in construction and easy to operate, but which is exceedingly accurate in the results obtained.

These and other objects, advantages and capabilities of the invention will become apparent from the following description wherein reference is had to the accompanying drawings in which.

For the purpose of illustrating the principles of the invention, it will be descibed as embodied in a sock measuring device, although it is to be understood that it could be embodied in devices for measuring such other articles of apparel as hats, shirts, or other flexible items.

Figure 1:
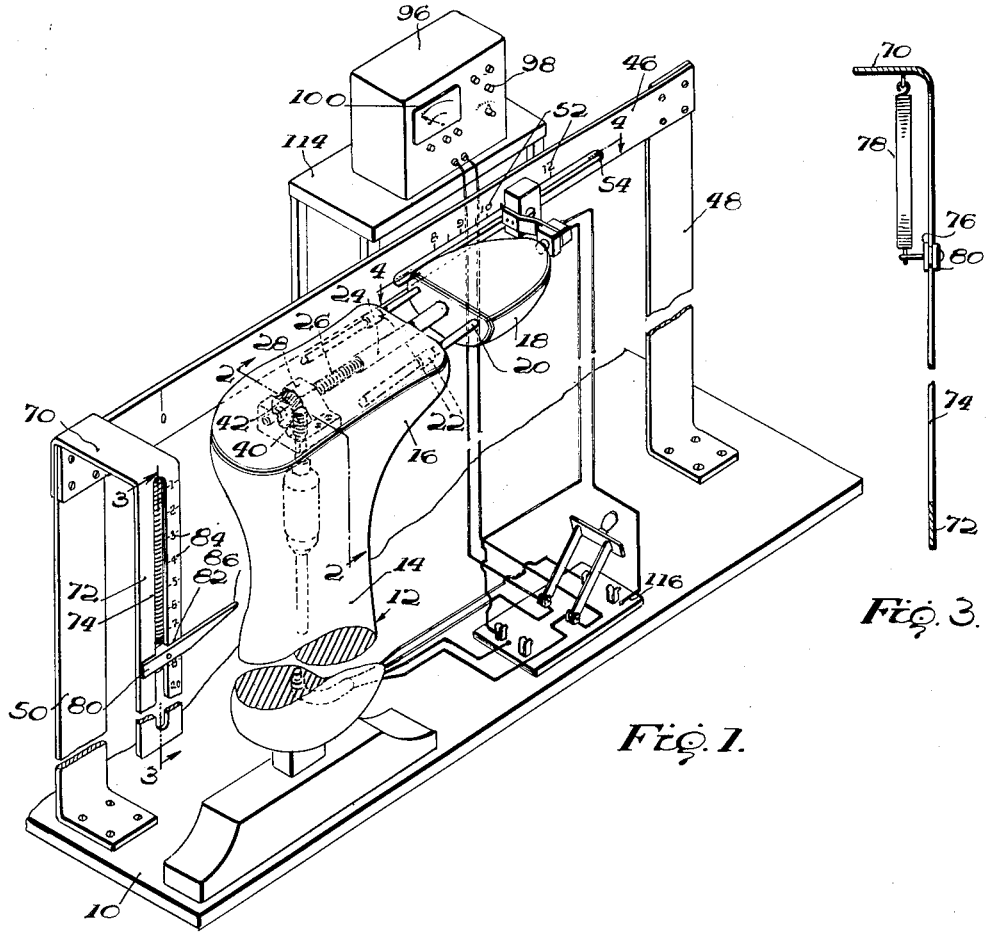
FIG. 1 is a more or less diagrammatic perspective view of the improved hose measuring device of the invention with the parts shown in inoperative position.

Referring to FIG. 1, the hose measuring device there shown comprises a base 10 upon which is rigidly supported in inverted position a form 12 simulating the portion of a human leg and foot below the knee. Form 12 includes a one-piece leg portion 14 and a two-piece foot portion including a main body part 16 integral with the leg portion 14 and a separate fore part 18 corresponding roughly to the toe portion of a foot, i.e., that portion of the foot forward of a vertical transverse plane through the region of the ball of the foot. This form, including the fore part 18, may be made from any suitable material which may be carved such as wood, or from a moldable plastics or any other material capable of being shaped to the desired form and of sufficient strength. Preferably the form 12 should be of a size corresponding to an average leg size. In one embodiment of the invention, the leg portion 14 was 19 inches long and the foot portion, including the fore part 18, was 8½ inches long when the fore part was in contracted position.

The fore part 18 is supported for reciprocatory movement on an axis corresponding to the longitudinal axis of the main body portion 16 of the foot of form 12 toward and from the main body portion 16 by a pair of guide rods 20 fixed in the fore part 18 on axes laterally spaced from the longitudinal axis of the main body portion 16 of the foot and parallel therewith. These guide rods are slidably receivable in suitably located apertures in the main portion 16 of the foot, non-friction bearings 22 preferably being provided to ease the movement of the fore part 18. A tubular power screw housing 24 is also fixed to the fore part 18 on an axis corresponding to the longitudinal axis of the main body portion 16 of the foot of the form 12. This housing receives and is operatively engaged by an elongated power screw 26 rotatably journalled at axially spaced points adjacent its rear end in suitable bearing structure 28 housed in a suitable recess or cavity 30 (FIG. 2) in the heel of form 12 which normally is closed by a removable cover plate 32. By rotating the power screw 26 in opposite directions, the fore part 18 may be moved in a forwardly or expanding direction relative to the main body portion 16 of the foot of the form 12, or in a rearwardly or contracting direction relative thereto.

Figure 2:
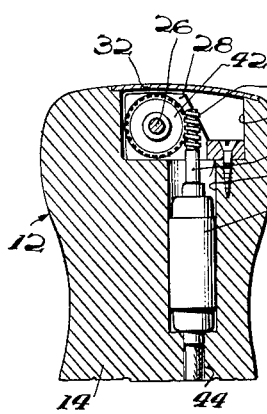
FIG. 2 is a vertical transverse sectional view on the line 2—2 of FIG. 1.

Power screw 26 is positively driven in opposite directions by a reversible shunt type electric motor 34 of suitable size, a 28-volt D.C. motor having been found to be suitable for this purpose. This motor is disposed on a vertical axis in a suitable recess 36 in the leg portion 14 of the form 12 which communicates with the bearing cavity 30 as best seen in FIG. 2. An extension 38 of the motor shaft projects into the bearing cavity 30 and has a worm 40 fixed on its outer end which is in operative engagement with a worm wheel 42 fixed on the rear end of the power screw 26 (FIGS. 1 and 2). Energization of the motor 34 to control forward or rearward movement of the fore part 18 of the form is controlled by circuits and control mechanism to be hereinafter described. As roughly indicated in FIGS. 1 and 2, the conductors for the motor 34 may be run through an aperture 44 extending from the motor cavity 36 to the base of the form 12 so as not to interfere with placement of hose on the form for measuring.

Figure 4:
FIG. 4 is a horizontal sectional view on the line 4—4 of FIG. 1.

A rigid bar or strap 46 (FIG. 1) is fixedly supported on an axis generally parallel to the longitudinal axis of the foot portion of form 12 closely adjacent the foot portion and on the side thereof which will hereinafter be referered to as the rear side, by means of suitable rigid vertically extending front and rear standards 48 and 50 respectively fixed to the base 10 and to the bar 46 adjacent opposite ends thereof by any suitable means. The bar 46 has indicia 52 marked on the forwardly facing side thereof including a zero point aligned with the rear-most part of the heel of form 12 and other indicia along the region of the bar or strap 46 aligned with the space forward of the main foot portion 16 of the form 12 to correspond to various standard foot size lengths as measured from the zero point. That portion of the bar 46 which bears the indicia 52 has a longitudinally extending slot 54 for receiving an anchor pin or screw 56 (FIG. 4) on a slide 58 which may be releasably locked at any desired position along the slot 54 by tightening a wing nut 60 threaded on the free or rear end of the anchor pin 56 so that it may be tightened against the back side of the bar 46 to clamp the slide 58 at a fixed position along the slot 54. Preferably that portion of the screw 56 which rides in the slot 54, is squared to hold the slide 58 against turning.

The slide 58 has an arm 62 fixed thereto which supports a microswitch 64 at a position to bring an operating button 66 on the switch into alignment with the axis of movement of the tip or foremost part of the fore part 18 of the form 12. Arm 62 has an offset portion to bring the button 66 and that side of the arm indicated at 68 in FIG. 4 into transverse alignment so that the size to which the foot of the form 12 has been expanded or contracted by forward or rearward movement of the fore part 18 may be read on the scale or indicia 52 on slotted bar 46 by sliding the slide 58 along slot 54 until the button 66 of microswitch 64 is brought into contact with the tip or foremost part of the fore part 18 of form 12. Since opening or closing movement of the button 66 is slight, the accuracy of the measurements made are not materially affected by such movements. Microswitch 64 is connected into the energizing circuit for the motor 34 in a manner which will be described hereinafter.

Figure 3:
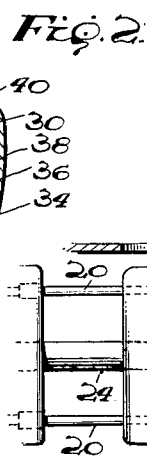
FIG. 3 is a vertical sectional view on the line 3—3 of FIG. 1.

In addition to the mechanism for measuring foot size above-described, the improved device of the present invention also includes mechanism to measure the length of a sock on the form 12. This mechanism includes an L-shaped rigid metal strap or bracket 70 (FIG. 1) supported in an inverted position from rear standard 50 to provide an elongated portion 72 rigidly supported in a depending position spaced a slight distance from the heel and calf portion of form 12 in alignment with the vertical medial axis of the leg portion 14 of the form 12. The depending portion 72 has a longitdinal slot 74 formed therein along which a slide pin 76 (FIG. 3) is freely slidable. This pin is biased upwardly of slot 74 by a spring 78 suspended at its upper end from the web of the inverted L-shaped strap 70 and connected at its lower end to a lug projecting rearwardly from the slide pin 76.

A pointer 80 is fixed on the end of the slide pin 76 projecting forwardly through the slot 74. The pointer 80 has a straight edge 82 for registering on the indicia of a scale 84 suitably marked on the depending portion 72 of the L-shaped strap 70 along the slot 74 and a tip 86 which is brought into alignment with the top or outer end of the welt of the sock on form 12 when the leg length of a sock is to be measured by drawing down on the pointer 80 against the resistance of the spring 78. The scale 84 is calibrated in inches and fractions of an inch so that the leg length of a sock will be indicated in inches on this scale by the straight edge 82 of the pointer when the latter is drawn down to the position above-mentioned.

Control of the operation of the electric motor 34 for driving the power or drive screw 26 and thus advancing or retracting fore part 18 of form 12 may be effected through a circuit such as that diagrammatically shown in FIG. 6, this particular circuit providing for two different methods of operating the measuring device as explained in detail hereinafter. Direct current is preferred for operating the device because steadier operation and more uniform reading on the electric indicators used in the practice of the present invention are obtainable with direct current than with alternating current. Since the current normally available in most localities is A.C., a rectifier indicated diagrammatically at 88 in FIG. 6 has been provided to convert A.C. to D.C. along with a rheostat 90 to control the output from the rectifier 88, and suitable indicating means including a voltmeter 92 and an ammeter 94.

In the actual practice of the invention, a commercially available instrument for converting A.C. to D.C. and for controlling the D.C. output has been used in which the rectifier, rheostat, voltmeter, ammeter and suitable controls are combined in one compact unit which has suitable manually operable knobs to control operation thereof and suitable indicating means for guiding the operator in the use of the device. One such instrument found suitable for the purposes of the present invention is the so-called "Power-Lab," Precice Model 711–713 made by Precise Development Corporation, Oceanside, New York. This instrument is indicated in its entirely at 96 in FIGS. 1 and 5 from which it will be seen that it has a manually operable knob 98 for adjusting rheostat 90 housed therein, a dial indicator 100 having a series of scales, including a high-voltage line scale 102, a low D.C. scale 104 for indicating D.C. amperage and a needle 106 for indicating on these two scales and the other scales forming a part of the dial indicator which will not be described in detail because they are not utilized in the practice of the present invention. A selector switch 108 is also provided which is shiftable by the operator to close connections which cause either high or low voltage or amperage to be indicated by the dial indicator 100, and to be supplied to output terminals 110, 112 on the current control instrument 96. As best seen in FIG. 1, this combined rectifier, rheostat and indicator 96 which will be designated the current control instrument or current controller hereinafter is mounted on a platform 114 immediately to the rear of the foot length measuring scale 52 on the slotted scale bar 46. The platform 114 is supported from the base 10 at a sufficiently elevated position so that the face of the current control instrument 96 is directly in front of the position at which an operator of the size-measuring machine will normally be stationed.

Figure 6:
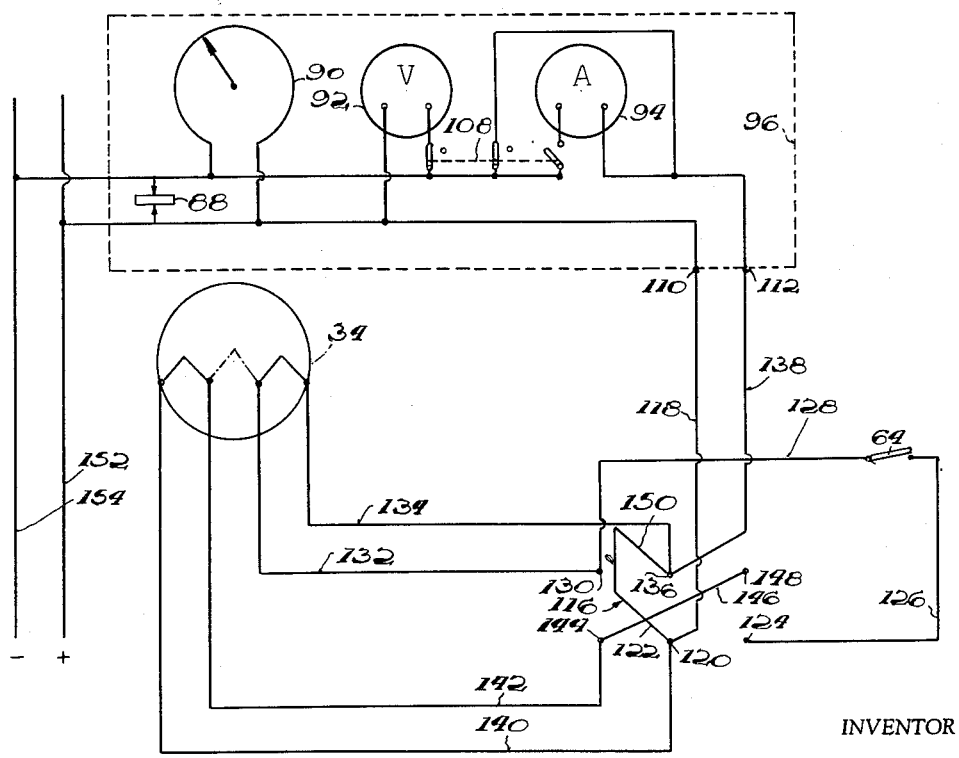

Returning now to the schematic wiring diagram, FIG. 6, the previously mentioned motor 34 for driving the drive screw 26 is indicated schematically along with the microswitch 64 and a manually operable double pole double throw switch 116. The latter switch is also shown in FIG. 1 from which it will be observed that it is mounted on the front side of the base 10 so as to be readily operable by an operator stationed in front of the measuring device at a position readily to observe the dial indicator 100 on the current controlling instrument 96. The latter is indicated in its entirety by the dotted lines in FIG. 6, the essential components thereof being schematically shown, as previously explained, within the confines of these lines and the output terminals 110, 112 along one of the bordering dotted lines. The manner in which the above-mentioned electrical components may be electrically interconnected and disconnected to control operation of the measuring device will now be described.

Assuming the fore part 18 of form 12 has been retracted sufficiently so that the hose to be measured, which may be a man's sock, for example, may be slipped over the form with more or less slack remaining in the foot of the sock, the manual double pole double throw switch 116 is then swung to a forward or operating position, i.e., to the right in FIGS. 1 and 6. This closes circuits between the output terminals 110, 112 and the motor 34 through a conductor 118, a contact 120, lower switch blade 122, a contact 124, a conductor 126 to the normally closed microswitch 64, and from this switch through a conductor 128, a contact 130, a conductor 132 to one of the field windings of the motor 34. From the latter, the circuit leads back to the output terminal 112 on the current controller 96 through a conductor 134, a switch contact 136, and a conductor 138. A circuit is also closed by the aforesaid closing of double pole double throw switch 116 through conductor 118, contact 120, a conductor 140, motor 34, a conductor 142, a switch contact 144, a bridge 146, a contact 148, upper switch blade 150, and contact 136 back to the output terminal 112 through conductor 138. The circuits thus closed will cause the motor 34 to rotate in a direction to cause the fore part 18 of form 12 to be fed in a forward or expanding direction. Rotation of the motor continues in this direction until either microswitch 64 or the manual double pole switch 116 is opened as explained hereinafter. The reason for this alternate control of termination of the operation of motor 34 will be described hereinafter.

In order to rotate the motor 34 in a direction to retract the fore part 18 of the form 12, the manual double pole switch 116 is swung to the left, as seen in FIGS. 1 and 6, into contacting engagement with the switch contacts 130, 144. A circuit from output terminals 110, 112 to the motor 34 is closed through conductor 118, contact 120, switch blade 122, contact 144, conductor 42, motor 34, conductor 132, contact 130, switch blade 150, contact 136, and conductor 138, back to the terminal 112. This reverses rotation of the motor 34 so that the drive screw 26 is rotated in a direction to retract the fore part 18 of form 12.

Two methods of measuring the size of hose or the shrinkage of hose may be practiced with the apparatus above described. The first method described hereinafter preferably is utilized in measuring the size and determining the shrinkage of hose made from materials other than stretch-type materials. It will be assumed that the hose to be measured has been drawn into position on the form 12 and that the current controller 96 has been connected to the line current indicated at 152 and 154 in FIG. 6. The manual selector switch 108 on the current controller 96 is then set so that the voltage on the low D.C. scale 104 will be indicated by the needle 106, and the manual rheostat adjusting knob 98 adjusted until the needle 106 comes to rest on the 28 volt mark on the low D.C. scale 104. After this adjustment has been made, the manual double pole switch 116 is shifted forward (to the right in FIGS. 1 and 6) as before explained, thus causing to be closed the circuits heretofore described for rotating motor 34 in a direction to advance the fore part 18 of form 12. Immediately after the manual double pole switch 116 has been closed, the selector switch 108 is shifted to render dial indicator 100 effective to indicate the amperage on the low D.C. scale 104. This causes the needle 106 to drop back approximately to the 5 ampere mark on the low D.C. scale 104. This change is made because the current controller 96 is much more sensitive to changes in amperage than to changes in voltage with a resulting much greater movement of the needle 106 when the current or amperage to the motor 34 changes than when the voltage changes.

Figure 5:
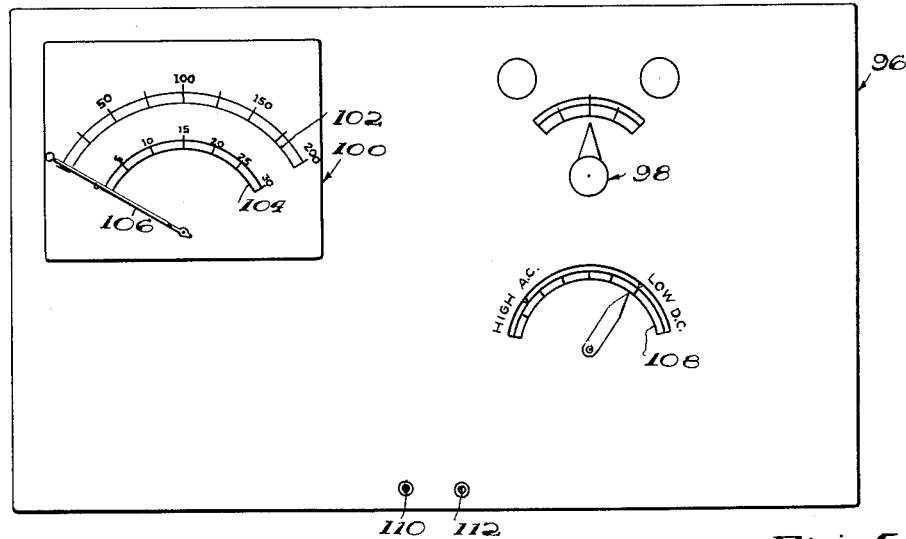
FIG. 5 is a front elevational view of a current controlling instrument forming part of the present invention; and, FIG. 6 is a schematic wiring diagram of the control system for the present invention.

As the fore part 18 is advanced by the continued forward rotation of motor 34 and power screw 26, slack is gradually taken up in the hose on form 12. When the slack has been completely taken up and the hose on the form begins to become taut, the increased resistance to continued forward movement or expansion of the fore part 18 will result in a drag on motor 34 and an increased demand for current which will be signalled by a gradual shifting of the needle 106 to the right (FIGS. 1 and 5). As soon as this needle begins to shift, i.e., when the hose on the form has filled out by expansion of the fore part 18, the manual double pole switch 116 is opened by the operator, thus discontinuing expansion of the form 12 at substantially the instant the hose became fully filled out. The size of this filled out hose may then be measured by moving the slide 58 along the slotted foot length measuring scale bar 46 until the button 66 on microswitch 64 engages the foremost part of the fore part 18 of the form 12. The size of the hose on the form will be indicated on scale 52 by the front side 68 of arm 62.

If it is desired to determine the amount a hose shrinks after a number of launderings, this can be done readily by the above-described first method. All that is necessary is that the laundered hose be placed on form 12 and its size determined by the above-described method. This size can then be compared with the size before laundering to determine shrinkage, and from these figures the percentage of shrinkage may be calculated.

In a second method of measuring shrinkage, the hose to be measured is placed on form 12 in the manner above described and the slide 58 then is adjusted along the foot length measuring scale bar 46 and locked at a position corresponding to the reputed size of the hose being measured by tightening the wing nut 60. The motor 34 is then started as above described, but instead of being shut down after the needle 106 shows that the slack has been taken up in the hose on form 12, the motor is allowed to continue to run until the foremost part of the fore part 18 engages the button 66 on microswitch 64, thus opening the motor energizing circuit. The point to which the needle 106 has advanced on line scale 102 of the current controller 96 at the time microswitch 64 opens is noted because the amount of the advance may be more easily read on this scale, although it could also be read on the low D.C. scale 104. Since the difference between the original and final voltages on the line scale 102, is directly proportional to the amount of shrinkage in the hose on the form 12, it will be apparent that the amount the hose on form 12 has shrunk from its original unlaundered size can be readily calculated. It will also be apparent that a scale could readily be calibrated from which the percentage of shrinkage of the hose on the form 12 could be directly read from the face of the dial indicator 100.

In measuring the leg length of hose, the leg of the hose on the form 12 is drawn down the leg portion 14 of the form until all wrinkles have been removed from the hose. Excessive tension on the hose should be avoided to prevent unnatural stretching. The pointer 80 is then drawn downwardly along the graduations of the depending scale 84 in opposition to the resistance of spring 78 until the tip 86 is aligned with the top edge of the welt of the hose on form 12. The leg length will be indicated by the straight edge 82 of the pointer 80 on the scale 84. If the leg length of stretch hose is being measured, the leg of this hose should be stretched down far enough on the leg 14 of form 12 so that it rides back somewhat when released. Measurements may then be made in the manner above described for non-stretch hose.

From the above description of the operation of the improved measuring device of the present invention and the method of using the same, its advantages over prior devices should be apparent. In the first place, it is more accurate because the hose or socks being measured are filled out in the same manner as they are when they are being worn and to a degree of tautness corresponding to that which is considered ideal in normal everyday wear of socks. This same degree of tautness may be obtained time after time in the use of the device of the present invention regardless of differences in the size of the socks being successively measured on the machine or of differences in the material of which these socks are made because of the sensitivity of the dial indicating means 100 to changes in the current demand resulting from the filling out of hose on the form 12 to its full size.

It is also to be noted that no damage is done to the socks being measured, whereas socks measured on such prior art devices as the Schiefer machine are perforated, thus making them unsalable. The reliance on human judgment necessary in other prior art methods of measuring socks is eliminated and the extreme and uniform sensitivity of the dial indicator 100 relied upon instead in measuring socks with the present inventon. The inaccuracies due to errors in human judgment which might easily result from the practice of these other prior art methods in the numerous measuring operations made during the course of a day are thus avoided in applicant's device.

While the device of the present invention may be used whenever it is desired to measure hose, it is designed particularly for use by inspectors, such as those individuals who make preacceptance tests of the hose furnished under contracts by the Armed Forces for the procurement of hose of all kinds, because of its accuracy and the rapidity with which measurement can be made, or the shrinkage of hose after laundering determined.

From the above description of the invention, it will be apparent that the principles thereof may be applied to machines for measuring items other than socks. For example, by the use of properly shaped form in place of the form 12 described above and the proper scales, the device might readily be made adapted for use in measuring hats, shirts, etc. In view of this fact, it is to be understood that when the term "hose" or "socks" is used in the appended claims, that these claims are not meant to be limited strictly to sock measuring devices. Instead, they are intended to include devices embodying the principles of the invention regardless of the specific article of apparel or other item which the particular device is intended to measure.

While a preferred embodiment of the invention has been shown and described, it will be apparent that variations and modifications thereof may be made without departing from the underlying principles of the invention. It is desired, therefore, by the following claims, to include within the scope of the invention, all such variations and modifications by which substantially the results of the invention may be obtained through the use of substantially the same or equivalent means.

I claim:

1. A device for measuring the size of relatively flexible articles of apparel such as hose comprising a multipart form shaped generally to simulate the form of the article to be measured, means to support the parts of said form for relative movement effective to expand the form without appreciable distortion of an article placed thereon from the normal shape assumed by it when worn and to contract the form from expanded condition, power-operated means for imparting relative movement to the parts of said form, means for deactivating said power-operated means upon the occurrence of relative movement between the said parts of said form sufficient at least to take up the slack in and to fill out an article fitted on said form to its normal shape and size and means to indicate the size to which the article on said form has been filled out.

2. A device for measuring the size of relatively flexible articles of apparel or the like such as hose comprising a multipart form shaped generally to simulate the form of the article to be measured, means to support the parts of said form for relative movement effective to expand the form without appreciable distortion of an article placed thereon from the normal shape assumed by it when worn and to contract the form from expanded condition, power-operated means for imparting relative movement to the parts of said form, means for signalling when expanding relative movement of the said parts of said form has proceeded far enough to take up the slack in and fill out an article of said form to its normal shape and size, means to control operation of said power-operated means including manually and automatically operable means conjointly operable to activate said power operated means, said manually operable means being operable to deactivate said power operated means upon signal from said signalling means and said automatically operable means being operable to deactivate said power operated means in response to predetermined relative movement of the parts of said form and means to indicate the size to which the article on said form has been filled out.

3. A device for measuring the size of relatively flexible articles of apparel or the like such as hose comprising a multipart form shaped generally to simulate the form of the article to be measured, means to support the parts of said form for relative movement effective to expand the form without appreciable distortion of an article placed thereon from the normal shape assumed by it when worn and to contract the form from expanded condition, power-operated means for imparting relative movement to the parts of said form, means for signalling when expanding relative movement of the said parts of said form has proceeded far enough to take up the slack in and fill out an article on said form to its normal shape and size, means to control operation of said power-operated means including manually and automatically operable means conjointly operable to activate said power operated means, said manually operable means being operable to deactivate said power operated means upon signal from said signalling means and said automatically operable means being operable to deactivate said power operated means in response to predetermined relative movement of the parts of said form, means to indicate the size to which the article on said form has been filled out and means for varying the degree of expansion required to activate said signalling means and to deactivate said power-driven means automatically.

4. A device for measuring the size of relatively flexible articles of apparel or the like such as hose comprising a two-part form shaped generally to simulate the form of the article to be measured, one part of said form being fixedly supported and the other part being linearly movable relative to the first along an axis effective to produce undistorted expansion of the article on said form and to contract the form from expanded condition, power-operated means for moving the movable part of said form along the axis of movement thereof, means for signalling when movement of said movable part of said form has proceeded far enough to take up the slack in and fill out the article on said form to its normal shape and size, means to control operation of said power-operated means including manually and automatically operable means conjointly operable to activate said power operated means, said manually operable means being operable to deactivate said power operated means upon signal from said signalling means and said automatically operable means being operable to deactivate said power operated means in response to predetermined relative movement of the parts of said form, a linear scale upon which the degree of expansion of said form may be measured and means for varying the degree of expansion of said form required to activate said signalling means and to deactivate said power-operated means automatically including means to indicate on said scale the degree of expansion of said form.

5. A device for measuring the size of relatively flexible articles of apparel or the like such as hose comprising a multipart form shaped generally to simulate the form of the article to be measured, means to support the parts of said form for relative movement in directions effective to expand the form without appreciable distortion of an article placed thereon from its normal shape and to contract the same, electrically operated means for imparting relative movement to the parts of said form, means for controlling operation of said electrically operated means including a manual switch and a limit switch responsive to the expansion of said form, means for adjusting the limit switch to vary the degree to which said form must be expanded before said limit switch responds and a scale to guide adjustment of said limit switch and to indicate the size of the article on said form when said article has been filled out and the form and limit switch are in switch-responding position.

6. A device for measuring relatively flexible articles of apparel or the like such as hose comprising a multipart form shaped generally to simulate the form of the article to be measured, means to support the parts of said form for relative movement in directions to expand and to contract said form, electrically operated means for imparting relative movement to the parts of said form, means for signalling variations in the current required to drive said electrically operated means substantially instantaneously upon the occurrence thereof, a manual switch to de-energize said electrically operated means upon predetermined signal of said signalling means, a limit switch automatically to de-energize said electrically operated means in response to relative movement of said relatively movable parts sufficient to effect predetermined expansion of said form and means for indicating article size and limit switch positions of adjustment.

7. A device for measuring the size of relatively flexible articles of apparel or the like such as hose comprising a two-part form shaped generally to simulate the form of the article to be measured, one part of said form being fixedly supported and the other part being linearly movable relative to the first along a fixed axis to expand said form without distorting an article placed thereon appreciably from the normal shape assumed by it when worn and to contract the form from expanded position, electrically operated means for moving the movable part of said form along the axis of movement thereof, a switch for manually controlling energization and de-energization of said electrically operated means, a normally closed limit switch in circuit with said manual switch, means for rigidly but releasably fixing said limit switch at varying positions of adjustment disposed to be tripped by said movable part of said form upon varying degrees of movement thereof in an expanding direction and means for indicating article size and limit switch positions of adjustment.

8. A device for measuring relatively flexible articles of apparel or the like such as hose comprising a multipart form shaped generally to simulate the form of the article to be measured, means to support the parts of said form for relative movement in directions to expand said form without distorting an article placed thereon appreciably from the normal shape assumed by it when worn and to contract the form from expanded condition, reversely operable means for imparting reverse relative movement to the parts of said form, a reversible electric motor for reversely driving said reversely operable means, an adjustable limit switch for automatically de-energizing said electrically operated means in response to relative movement of said relatively movable parts sufficient to effect predetermined expansion of said form, indicating means including article size and limit switch position indicating means, and a manual reversing switch in circuit with said limit switch for manually controlling energization and de-energization of said motor and the direction of rotation thereof.

9. A device for measuring the size of relatively flexible articles of apparel or the like such as hose comprising a two-part form shaped generally to simulate the form of the article to be measured, one part of said form being fixedly supported and the other part being linearly movable relative to the first along a fixed axis to expand and contract the size of said form, electrically operated means for moving the movable parts of said form along the axis of movement thereof, a switch for manually controlling energization and de-energization of said electrically operated means, a normally closed limit switch in circuit with said manual switch, an elongated limit switch-supporting member fixed on an axis parallel with the axis of movement of said movable member, means for fixedly but releasably anchoring said limit switch at varying positions of adjustment lengthwise of said supporting member and disposed to be tripped by the said movable part of said form upon expanding movement thereof, article size-measuring indicia on said elongated switch supporting member, said means for anchoring said limit switch to said supporting member including a part to register on said indicia the sizes to which the said form will have been expanded when said limit switch is tripped at the various positions of adjustment thereof.

10. A device for measuring the size of relatively flexible articles of apparel such as hose comprising a multipart form shaped generally to simulate the form of the article to be measured, means to support the parts of said form for relative movement in an expanding or in a contracting direction, power-operated means for imparting relative movement to the parts of said form, means for signalling when the expansion of said form has proceeded far enough to take up slack in the article upon said form, means for manually deactivating said power-operated means upon predetermined signal of said signalling means and means for visually indicating the size of an article filled out by expansion of said form.

11. A device for measuring relatively flexible articles of apparel or the like such as hose comprising a multipart form shaped generally to simulate the form of the article to be measured, means to support the parts of said form for relative movement in an expanding and in a contracting direction, electrically operated means for imparting relative movement to the parts of said form, means for signalling variations in current consumption by said electrically operated means substantially instantaneously upon the occurrence thereof, means for controlling operation of said electrically operated means including a manual switch to interrupt the flow of current to said electrically operated means upon predetermined signal of said signalling means, a fixed scale and indicator means adjustable upon termination of the operation of said electrically operated means by operation of said manual switch to indicate on said scale the size of the article on said form.

12. A device for measuring the size of relatively flexible articles of apparel or the like such as hose comprising a multipart form shaped generally to simulate the form of the article to be measured, means to support the parts of said form for relative movement in an expanding or in a contracting direction, power-operated means for imparting relative movement to the parts of said form, means for automatically deactivating said power-operated means upon predetermined expansion of said relatively movable parts and indicating means including means actuated by an increase in the resistance of the article on said form to the predetermined expansion of said relatively movable parts, said indicating means being calibrated to permit determination of the degree by which the size of the article on said form falls short of the size to which the form is expanded by the predetermined movement of said relatively movable parts.

13. A device for measuring hose comprising a foot simulating form including a main body portion and a separate fore part consisting of the portion of said form forward of a transverse plane in the area of the ball of the foot, means to mount said fore part for fore and aft movement along the longitudinal axis of said form, drive means including a member housed in the main body of said form and a member fixed to said fore part of said form, said members cooperating to move said fore part in a fore and aft direction along the longitudinal axis of said form, power-operated means for driving said drive means, means for deactivating said power-operated means after the slack in the hose on said form has been taken up and indicating means including means for indicating when the slack has been taken up in the hose on said form and for indicating hose size.

14. A device for measuring hose comprising a foot simulating form to receive the hose to be measured including a separate fore part movable upon the longitudinal axis of said form in a direction to take up slack in the foot portion of a hose draped over said form, electrically operated means for moving said fore part of said form in the aforesaid direction, means for controlling the operation of said electrically operated means including a manual switch and an automatically operable limit switch shiftable at will upon a longitudinal axis parallel with the longitudinal axis of said form and including a part disposed to be engaged by the foremost part of said fore part of said form, means for releasably anchoring said limit switch at any desired position of adjustment along the longitudinal axis upon which it is adjustable, stationary hose size indicia and indicator means movable with said limit switch for indicating on said indicia the hose sizes corresponding to various positions at which said limit switch may be set.

15. A device for measuring hose comprising a form to simulate a leg and foot of unitary construction throughout except for a separate fore part on the said foot portion of said form movable in a direction to expand and contract the foot size of said form, structure for fixedly supporting said unitary leg and foot portion of said form, means for moving said fore part to expand the foot size of said form sufficiently at least to take up the slack in the foot of the hose on said form, means for signalling that the slack has been taken up in the foot of the hose on said form, means for measuring the foot size of the hose on said form, a linear scale fixed to said supporting structure in parallel relation to the longitudinal axis of the leg portion of said form and closely spaced thereto and an indicator including a part to register with the free end of the welt of the hose on said form and a part to register on said scale the length of the leg portion of the hose on said form.

16. A device for measuring hose comprising a form to simulate a leg and foot of unitary construction throughout except for a separate fore part on the said foot portion of said form movable in a direction to expand and contract the foot size of said form, structure for fixedly supporting said unitary leg and foot portion of said form, means for moving said fore part to expand the foot size of said form sufficiently at least to take up the slack in the foot of the hose on said form, means for signaling that the slack has been taken up in the hose on said form, a linear scale rigidly fixed to said supporting structure in parallel relation to the longitudinal axis of the foot portion of said form and closely spaced thereto, an indicator including a part to register with said fore part and a part to register the foot size on said linear scale, a second linear scale rigidly fixed to said supporting structure in parallel relation to the longitudinal axis of the leg portion of said form and closely spaced to the said leg portion, the axis of said two scales being substantially perpendicular and an indicator including a part to register with the free end of the welt of the hose on said form and a part to register the length of the leg portion of the said hose on said second scale.

References Cited in the file of this patent

UNITED STATES PATENTS

| | | |
|---|---|---|
| 2,066,310 | Appel et al. | Jan. 5, 1937 |
| 2,388,256 | Davis | Nov. 6, 1945 |
| 2,669,867 | Holmes | Feb. 23, 1954 |
| 2,794,340 | Cobert | June 4, 1957 |